(12) United States Patent
Poisson et al.

(10) Patent No.: US 12,250,472 B2
(45) Date of Patent: Mar. 11, 2025

(54) SURVEILLANCE SYSTEM FOR A ROAD WITH ALTERNATING UNITS AND ASSOCIATED METHOD

(71) Applicant: ALSTOM Holdings, St Ouen sur Seine (FR)

(72) Inventors: Pascal Poisson, Sceaux (FR); Vincent Bonnevay, Lyons (FR); Benedetto Carambia, Florence (IT); Andrea Del-Chiaro, Florence (IT); Antonio Malagutti, Bologna (IT); Andrea Malesci, Florence (IT)

(73) Assignee: ALSTOM Holdings, Saint-Ouen-sur-Seine (FR)

( * ) Notice: Subject to any disclaimer, the term of this patent is extended or adjusted under 35 U.S.C. 154(b) by 148 days.

(21) Appl. No.: 18/047,600

(22) Filed: Oct. 18, 2022

(65) Prior Publication Data
US 2023/0119417 A1 Apr. 20, 2023

(30) Foreign Application Priority Data
Oct. 20, 2021 (FR) ...................................... 21 11133

(51) Int. Cl.
| | |
|---|---|
| H04N 23/90 | (2023.01) |
| G06V 20/54 | (2022.01) |
| G08G 1/04 | (2006.01) |
| H04N 7/18 | (2006.01) |

(52) U.S. Cl.
CPC ............ *H04N 23/90* (2023.01); *G06V 20/54* (2022.01); *G08G 1/04* (2013.01); *H04N 7/18* (2013.01)

(58) Field of Classification Search
CPC .......... H04N 23/90; H04N 7/18; G06V 20/54; G08G 1/04; G08G 1/0133; G08G 1/0116
See application file for complete search history.

(56) References Cited

U.S. PATENT DOCUMENTS

| | | | | |
|---|---|---|---|---|
| 5,939,987 A | * | 8/1999 | Cram ..................... | G08G 1/095 340/573.2 |
| 2010/0201829 A1 | * | 8/2010 | Skoskiewicz ............ | G08G 1/04 348/E5.042 |
| 2011/0182473 A1 | * | 7/2011 | Wang ..................... | G06V 20/54 382/103 |

(Continued)

FOREIGN PATENT DOCUMENTS

| | | | | |
|---|---|---|---|---|
| DE | 41 02 381 A1 | | 7/1992 | |
| DE | 102020105840 A1 | * | 9/2021 | ......... G01S 13/0209 |

(Continued)

OTHER PUBLICATIONS

Search Report issued for French Patent Application No. 2111133, dated Jun. 21, 2022 in 2 pages.

(Continued)

*Primary Examiner* — Fernando Alcon
(74) *Attorney, Agent, or Firm* — Knobbe, Martens, Olson & Bear, LLP

(57) ABSTRACT

A surveillance system for traffic on a road includes a number of surveillance units. Each of the surveillance units is mounted at height, and includes at least one road traffic detection sensor. The surveillance units are placed along the road alternately on a first side and on a second side of the road. The surveillance system can be used in an associated surveillance method for traffic on a road.

8 Claims, 2 Drawing Sheets

(56) References Cited

U.S. PATENT DOCUMENTS

| | | | |
|---|---|---|---|
| 2012/0098479 A1* | 4/2012 | Hsieh | H04N 7/18 |
| | | | 320/101 |
| 2013/0050652 A1* | 2/2013 | Wharton | F16M 11/425 |
| | | | 248/323 |
| 2014/0267728 A1* | 9/2014 | Dahlin | G06K 7/10366 |
| | | | 348/148 |
| 2017/0178476 A1* | 6/2017 | Jeon | H04N 23/64 |
| 2017/0243479 A1* | 8/2017 | Hill | G06V 20/54 |
| 2017/0272663 A1* | 9/2017 | Wang | H04N 23/69 |
| 2020/0356787 A1* | 11/2020 | Contegno | G08G 1/0112 |
| 2020/0396385 A1* | 12/2020 | Numata | H04N 23/69 |
| 2021/0027624 A1 | 1/2021 | Oberdanner et al. | |
| 2021/0029328 A1* | 1/2021 | Zhang | G06V 20/52 |
| 2022/0017115 A1* | 1/2022 | Biala | G01C 21/3407 |

FOREIGN PATENT DOCUMENTS

| | | | |
|---|---|---|---|
| EP | 1 772 836 A1 | 4/2007 | |
| EP | 3 379 515 A1 | 9/2018 | |
| GB | 2420636 A * | 5/2006 | G08G 1/04 |

OTHER PUBLICATIONS

Datondji et al., "Rotation and Translation Estimation for a Wide Baseline Fisheye-Stereo at Crossroads Based on Traffic Flow Analysis"; 2016 IEEE 19th International Conference on Intelligent Transportation Systems (ITSC), IEEE, pp. 1534-1539, Nov. 1, 2016.

* cited by examiner

SURVEILLANCE SYSTEM FOR A ROAD WITH ALTERNATING UNITS AND ASSOCIATED METHOD

CROSS-REFERENCE TO RELATED APPLICATION

This application claims priority to French Patent Application No. 21 11133 filed on Oct. 20, 2021, the disclosure of which including the specification, the drawings, and the claims is hereby incorporated by reference in its entirety.

FIELD OF THE INVENTION

The present invention relates to a surveillance system for traffic on a road, comprising a plurality of surveillance units, every surveillance unit being mounted at height, every surveillance unit comprising at least one sensor for detecting the traffic on the road.

The present invention further relates to the associated method.

BACKGROUND OF THE INVENTION

Document EP 1 772 836 A1 describes a road traffic management and assistance system comprising a network and multifunctional units installed in series along a road.

The multifunctional units comprise means for detecting vehicle traffic.

However, in such a configuration, when a car is driving next to a truck at substantially the same speed, the truck being placed between the car and the row of multifunctional units, the truck hides the car, so the detection made is not representative of the actual traffic.

SUMMARY OF THE INVENTION

A subject matter of the invention is thus to improve the reliability of the detection of a road surveillance system.

To this end, the invention relates to a system of the aforementioned type, wherein the surveillance units are placed along the road alternately on a first side and on a second side of the road.

The alternating layout of the surveillance units reduces the risk of a vehicle hiding another vehicle, as the side from which the surveillance takes place varies, and thus improves the reliability of the detection.

The system can further have one or a plurality of the following features, considered individually or in all technically possible combinations:
- the at least one traffic detection sensor comprises at least one camera and/or at least one lidar sensor and/or at least one radar sensor;
- the surveillance units are arranged so that the at least one traffic detection sensor of all the surveillance units covers the entire road;
- the surveillance units are placed along the road at a regular interval according to the direction of the road with a tolerance depending on the topology of the road;
- the at least one traffic detection sensor of each surveillance unit comprises at least one so-called zoom camera, the regular interval being suitable for every surveillance unit to be arranged at the resolution limit of the one or every zoom camera of the one or every adjacent surveillance unit which monitor in the direction of said surveillance unit;
- the regular interval is so that every location of the road is within the field of view of at least one traffic detection sensor of at least two of the surveillance units;
- every surveillance unit comprises at least one set suitable for surveillance of the road by the surveillance unit in one direction of the road, the one or every set comprising at least two different cameras;
- the at least two different cameras of the at least one set comprise a so-called wide-angle camera and a so-called zoom camera, the so-called wide-angle camera having a focal length comprised between 10 mm and 13 mm, the so-called zoom camera having a focal length comprised between 25 mm and 45 mm;
- every surveillance unit comprises a first set suitable for surveillance of the road in a first direction of the road and a second set suitable for surveillance of the road in a second direction of the road opposite to the first direction; and/or
- every surveillance unit comprises at least one color camera and at least one thermal camera.

The invention further relates to a surveillance method for traffic on a road, comprising the system of a surveillance system comprising a plurality of surveillance units, every surveillance unit being mounted at height, every surveillance unit comprising at least one traffic detection sensor, the surveillance units being placed along the road alternately on a first side and on a second side of the road.

BRIEF DESCRIPTION OF THE DRAWINGS

Other features and advantages of the invention will appear upon reading the following description which follows embodiments of the invention, given only as a limiting example, and making reference to the following drawings, wherein.

DETAILED DESCRIPTION OF THE PREFERRED EMBODIMENTS

Figure 1:
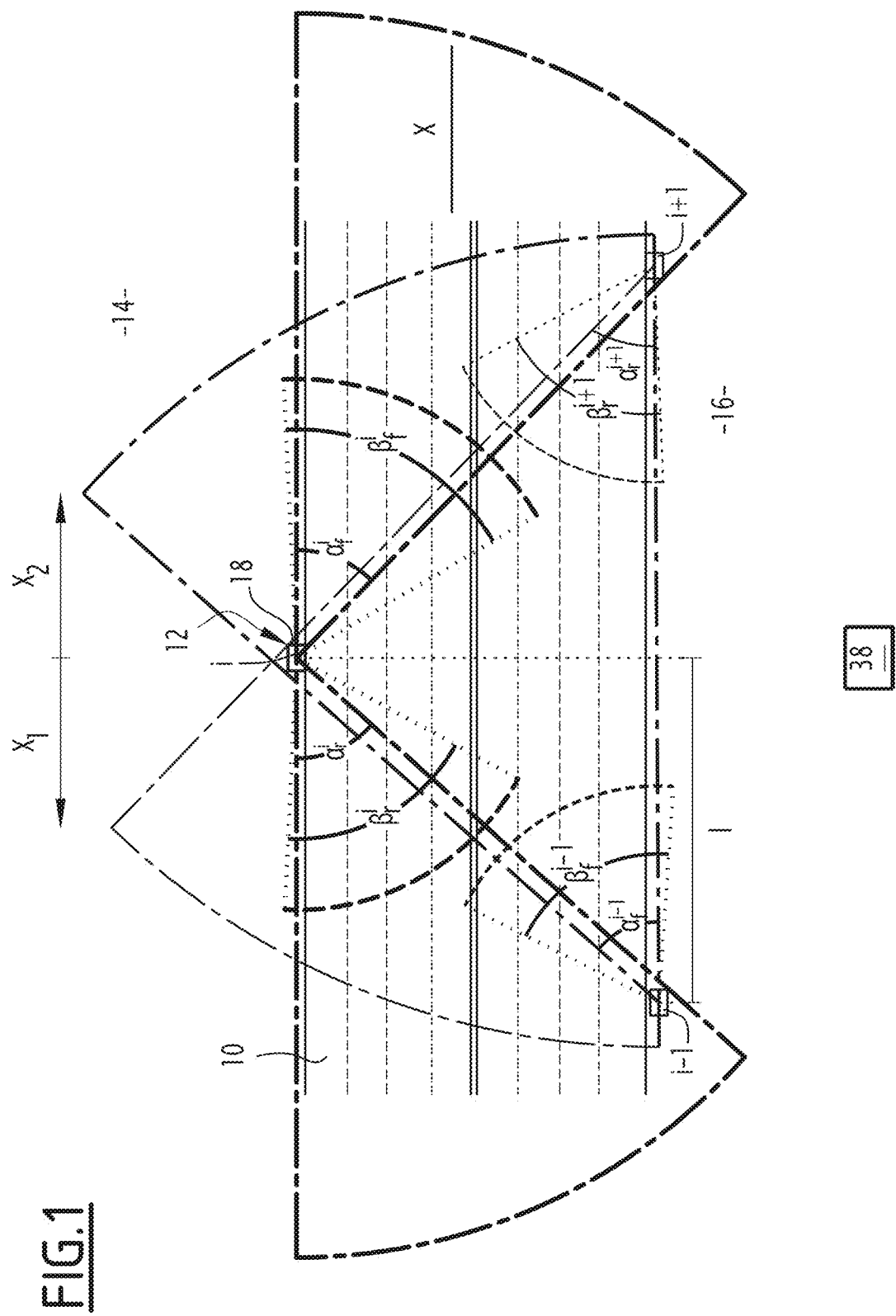
FIG. 1 is a schematic top view of a road equipped with a system according to an embodiment of the invention.

A portion of road 10 equipped with a traffic surveillance system 12 according to one embodiment of the invention is shown in FIG. 1. FIG. 1 shows only a portion of the system, which is repeated along the direction X of the road.

The road 10 extends in one direction, the direction having two ways X1, X2 corresponding to the two directions of travel in the case of a two-way road or to the direction of travel and to the opposite direction in the case of a one-way road.

The road 10 defines a first side 14 and a second side 16.

The surveillance system 12 comprises a plurality of surveillance units 18.

The surveillance units 18 are placed along the road, more particularly at a regular interval I in the direction X of the road with a tolerance depending on the topology of the road.

The tolerance is e.g. 5% in the case of a straight road.

The tolerance is e.g. greater for a road with a curve or a steep slope. In this way it is possible to have a greater overlap.

The regular interval I is comprised e.g. between 100 m and 200 m.

The surveillance units 18 are arranged close to the roadside.

The distance between the surveillance units and the roadside depends on the standards applicable to the location, including the country of the surveillance system.

The distance is comprised e.g. between 50 cm and 3.0 m from the roadside.

The surveillance units 18 are arranged alternately on the first side 14 and the second side 16 of the road.

Thus, every surveillance unit 18, here of rank numbered i, apart from a possible first and/or last surveillance unit of the system, has two so-called adjacent surveillance units, of rank numbered i−1 and i+1, to said surveillance unit.

The adjacent surveillance units i−1 and i+1 are arranged on the side of the road opposite to the side of said surveillance unit i. The distance along the direction of the road X between said surveillance unit i and every adjacent surveillance unit i−1 and i+1 is equal to the regular interval i within the tolerance.

The adjacent surveillance units i−1 and i+1 to the same surveillance unit i are arranged therebetween on the same side of the road 10. Same are substantially aligned along the direction X of the road.

Adjacent surveillance units i−1 and i+1 to the same surveillance unit i are spaced by twice the regular interval I within the tolerance.

Every surveillance unit 18 is mounted at height with respect to the road, more particularly arranged at the top of a post 20. Every surveillance unit is e.g. at a height comprised between 5 m and 15 m with respect to the road.

Every surveillance unit 18 comprises at least one traffic detection sensor.

The set of at least one traffic detection sensor of all the surveillance units 18 herein covers the entire road 10.

More particularly, the fields of view of the at least one traffic detection sensor of every surveillance unit 18 covers the entire road 10.

In this way it is possible to have information about the entire road. Such information is particularly useful in road surveillance for an outside observer, e.g. a company responsible for road management and/or possible accidents, and also for vehicles and/or drivers, who are likely to adapt the driving thereof depending on such information or to anticipate a future event. In the case of a self-driving car, the above can be used for a better adaptability of the car's driving to the environment thereof.

Figure 2:
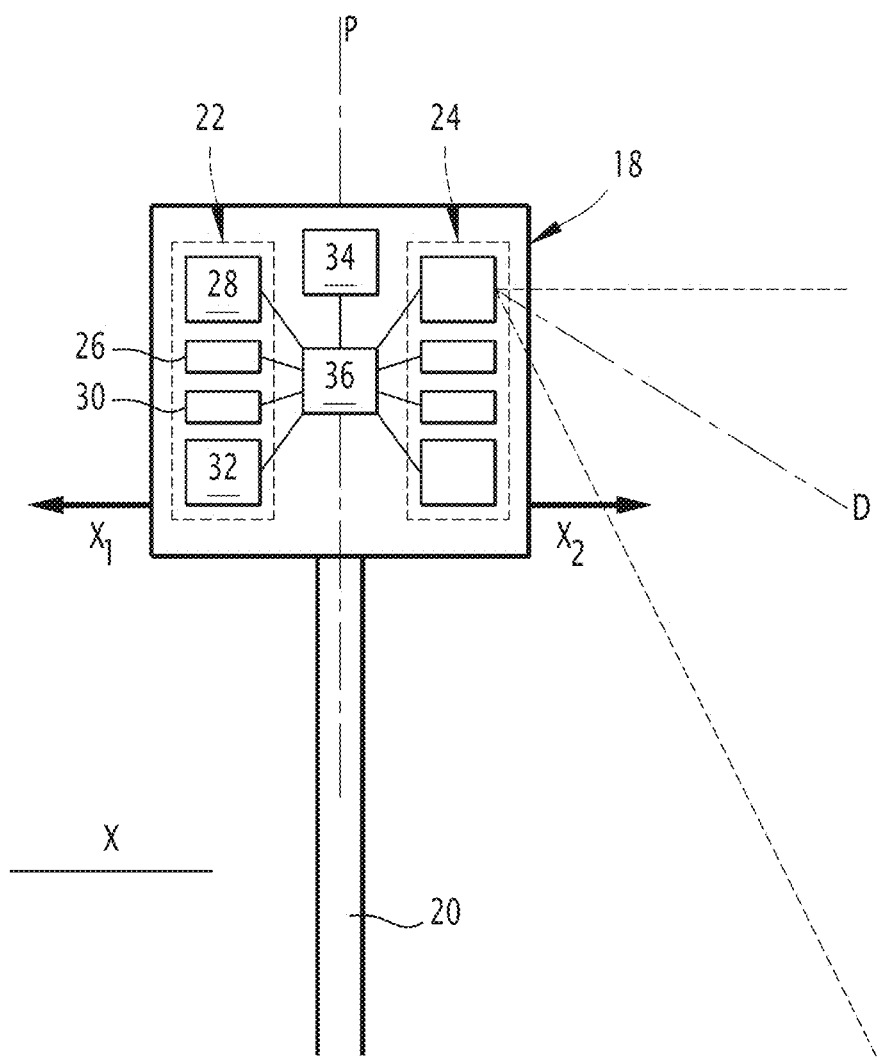
FIG. 2 is a view representative of the surveillance system shown in FIG. 1.

An example of a surveillance unit according to an embodiment of the invention is shown schematically in FIG. 2.

The surveillance units 18 are e.g. identical to each other.

In the example shown, every surveillance unit 18 comprises a first set 22 and a second set 24. The first set 22 is suitable for surveillance of the road by the surveillance unit 18 along a first way X1 of the two ways of the road. The second set 24 is suitable for surveillance of the road by the surveillance unit along the second way X2 of the two ways of the road.

The first way X1 and the second way X2 are opposite.

The first set 22 comprises at least one means of detection, herein at least two different means of detection.

The field of view of every means of detection is such that with the positioning of the posts 20 along the road and the height of each means of detection, the coverage of the road is complete.

The mean(s) of detection are e.g. camera(s).

Additionally or alternatively, the means of detection comprises at least one radar sensor and/or at least one lidar sensor.

The one camera or every camera has/have a respective optical axis D.

The optical axis is arranged so as to minimize the shadow areas created by vehicles.

The first set 22 comprises e.g. at least one color camera and at least one thermal camera.

The first set 22 comprises e.g. two cameras having a focal length different from one another, more particularly a so-called wide-angle camera and a so-called zoom camera.

The ratio between the focal length of the zoom camera and the focal length of the so-called wide-angle camera is greater than or equal to 2.

The wide-angle camera has a focal length comprised between 10 mm and 13 mm, more particularly equal to 13 mm.

The focal length of the wide-angle camera is such that the wide-angle camera covers an area from the given surveillance unit to the next opposite surveillance unit, in the example shown.

The wide-angle camera has a horizontal viewing angle $\beta_r^i$.

The zoom camera has a focal length comprised between 25 mm and 45 mm, more particularly equal to 35 mm.

The focal length of the zoom camera is such that the zoom camera covers an area ranging from the mid-distance between two consecutive opposite surveillance units and the adjacent surveillance unit.

The zoom camera has a horizontal viewing angle $\alpha_r^i$.

The zoom camera has a resolution such that the system, e.g. the central processing device subsequently mentioned, is apt to discriminate an area compatible with the expected performance, e.g. greater than or equal to 20 pixels per meter.

The regular interval I is chosen such that the combination of the camera fields of the surveillance units covers the road.

The regular interval I is chosen in particular depending on the number of detection sensors, the fields of view thereof and the resolutions thereof.

The regular interval I is suitable herein for every surveillance unit to be arranged at the resolution limit of a detection sensor, herein the or a zoom camera, of the or every adjacent surveillance unit which monitor in said direction, i.e. In the direction of said surveillance unit. In the example shown, the surveillance unit i is arranged at the resolution limit of the zoom camera oriented along the way X2 of the surveillance unit i−1 and at the resolution limit of the zoom camera oriented along the way X1 of the surveillance unit i+1.

The regular interval I is such that there is a level of redundancy of detection over every interval by a plurality of means of detection.

The regular interval I is such that every location of the road 10 is within the field of view of at least one traffic detection sensor 26, 28, 30, 32 of at least two of the surveillance units 18, herein within the field of view of at least one zoom camera of at least two of the surveillance units.

In the example shown, the first set 22 comprises two color cameras 26, 28, more particularly a wide-angle color camera 26 and a zoom color camera 28, and two thermal cameras 30, 32, more particularly a wide-angle thermal camera 30 and a zoom color camera 32, having a different focal length from each other.

The wide-angle color camera 26 and the wide-angle thermal camera 30 have substantially the same field of view.

The color zoom camera 28 and the thermal zoom camera 32 have substantially the same field of view.

Color cameras have a higher resolution than the resolution of thermal cameras.

The above makes it possible to obtain a minimum number of pixels per meter for every camera.

The color cameras 26, 28 and the thermal cameras 30, 32 are jointly used for effectively detecting various situations of visibility.

The second set 24 comprises the same elements, more particularly herein the same cameras, as the first set 22.

The second set 24 is e.g. the image of the first set 22 by reflection along a median plane P perpendicular to the direction X of the road.

In the example shown, every surveillance unit 18 comprises e.g. a communication module 34 and, furthermore herein, in addition, a central module 36.

The communication module 34 is suitable for transmitting data from the surveillance unit 18 via a communication network.

The communication module comprises e.g. a transmitter, more particularly an antenna.

Alternatively, the communication module 34 is suitable for transmitting data via a wired network.

The central module 36 is suitable for receiving the data from the at least one detection sensor, herein from all the cameras, and for sending the data to the communication module for transmission.

The surveillance system 12 further comprises at least one central processing device 38.

The communication modules 34 of the surveillance units 18 are each suitable for communicating with at least one of the at least one central processing device 38.

Thus, the surveillance system makes possible a complete surveillance of the road, due to all the surveillance units and to the coverage thereof of the entire road.

An example of a surveillance unit was described. Nevertheless, the surveillance units of a surveillance system according to the invention can differ from the example described, e.g. according to the variants mentioned hereinafter.

Alternatively, the surveillance units do not comprise thermal cameras.

Alternatively, the or every set of the surveillance unit includes a single camera.

Alternatively, the cameras of the or of every set of the surveillance unit have a substantially equal focal length between the cameras.

Additionally or alternatively, the at least one traffic detection sensor of every surveillance unit comprises at least one lidar sensor and/or at least one radar sensor.

In an alternative embodiment (not shown), every surveillance unit comprises a single set suitable for monitoring the road from the surveillance unit in one way of the road. All the sets of the surveillance units are e.g. arranged for monitoring the road along the same way of the road.

The surveillance system has been shown in FIG. 1 with respect to a straight road. However, the invention is also applicable to a curved road, the direction X of the road then corresponding e.g. to the median curve of the two roadsides.

A surveillance method for a road 10 will now be described with reference to the invention.

The method comprises a step of setting up a surveillance system 12 as described above, the surveillance units 18 being placed along the road 10 alternately on a first side 14 and on a second side 16 of the road 10.

Every surveillance unit 18 monitors a portion of the road 10 by means of at least one traffic detection sensor 26, 28, 30, 32.

The data acquired by the at least one traffic detection sensor 26, 28, 30, 32 are e.g. sent to the central processing device 38 via the communication module 34.

In this way it is possible to recover the data acquired e.g. for processing same by a computer in order to infer therefrom the presence of different vehicles, the respective speed and/or acceleration thereof, the density of the vehicles and the presence of an accident and/or of obstacles, if any.

Additionally or alternatively, in this way it is possible to display the acquired data, for visual surveillance.

The layout of the surveillance units alternately on each side of the road makes it possible to observe the road from different points of view.

In particular, in the case of a truck driving on the right lane with a car driving on the left lane depending on the way of travel, the car could be hidden by the truck in the case of a surveillance unit on the right-hand side of the road, whereas the car would be not hidden in the case of a surveillance unit on the left-hand side of the road.

Thus, the surveillance system according to the invention makes it possible to improve the reliability of the information obtained by the surveillance units, and hence of the road surveillance.

What is claimed is:

1. A surveillance system for traffic on a road, comprising a plurality of surveillance units, every surveillance unit being mounted at height, every surveillance unit comprising at least one sensor for detecting the traffic on the road, wherein the plurality of surveillance units are arranged so that the traffic detection sensors of all the surveillance units cover the entire road, and the plurality of surveillance units are placed along the road alternately on a first side and on a second side of the road, and at a regular interval along a direction of the road with a tolerance depending on a topology of the road, wherein the plurality of surveillance units are placed at the regular interval such that every location of the road is within a field of view of at least two sensors of which one sensor is comprised in one of the plurality of surveillance units and another sensor is comprised in another of the plurality of surveillance units.

2. The surveillance system according to claim 1, wherein the at least one traffic detection sensor comprises at least one camera and/or at least one lidar sensor and/or at least one radar sensor.

3. The surveillance system according to claim 1, wherein the at least one traffic detection sensor of every surveillance unit comprises at least one zoom camera, the regular interval being suitable for every surveillance unit to be arranged at a resolution limit of the at least one zoom camera of the adjacent surveillance unit monitoring in said direction.

4. The surveillance system according to claim 1, wherein every surveillance unit comprises at least one set suitable for monitoring the road from the surveillance unit along a way of the road, said at least one set comprising at least two different cameras.

5. The surveillance system according to claim 4, wherein the at least two different cameras of the at least one set comprises a wide-angle camera and a zoom camera, the wide-angle camera having a focal length comprised between 10 mm and 13 mm, the so-called zoom camera having a focal length comprised between 25 mm and 45 mm.

6. The surveillance system according to claim 1, wherein every surveillance unit comprises a first set suitable for monitoring the road along a first way of the road and a second set suitable for monitoring the road along a second way of the road opposite to the first way.

7. The surveillance system according to claim 1, wherein every surveillance unit comprises at least one color camera and at least one thermal camera.

8. A surveillance method for traffic on a road, comprising setting up a surveillance system comprising a plurality of surveillance units, every surveillance unit being mounted at height, every surveillance unit comprising at least one traffic detection sensor, the plurality of surveillance units being arranged so that the traffic detection sensors of all the surveillance units cover the entire road, and the plurality of surveillance units being placed along the road alternately on a first side and on a second side of the road and at a regular interval according to a direction of the road with a tolerance depending on the topology of the road, wherein the plurality of surveillance units are placed at the regular interval such that every location of the road is within a field of view of at least two sensors of which one sensor is comprised in one of the plurality of surveillance units and another sensor is comprised in another of the plurality of surveillance units.

* * * * *